June 30, 1925.
S. J. BUDD ET AL
FISHING REEL
Filed Feb. 1, 1923
1,544,128
2 Sheets-Sheet 1
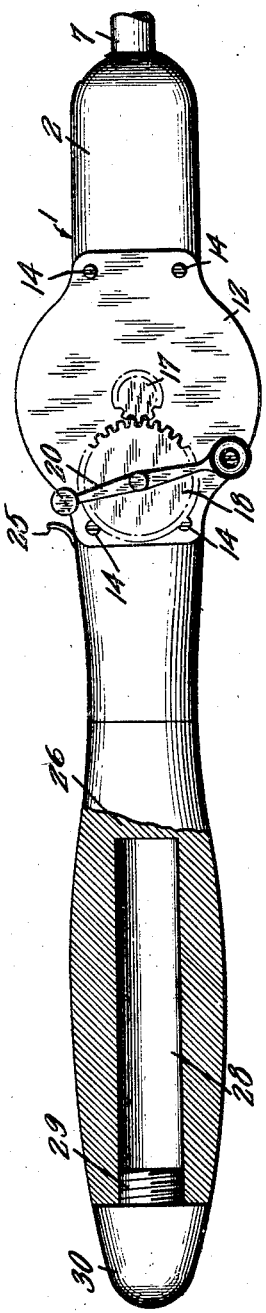
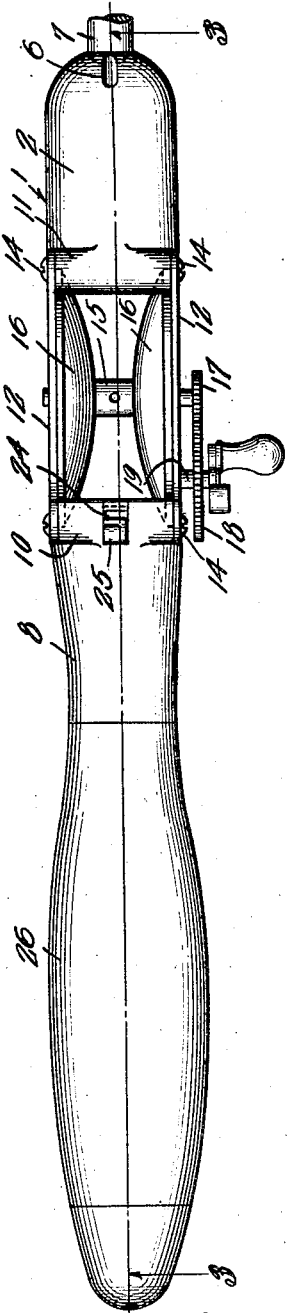
Inventor
S. J. Budd AND
J. C. Ford
By C. A. Snow & Co.
Attorneys June 30, 1925.
S. J. BUDD ET AL
FISHING REEL
Filed Feb. 1, 1923
1,544,128
2 Sheets-Sheet 2
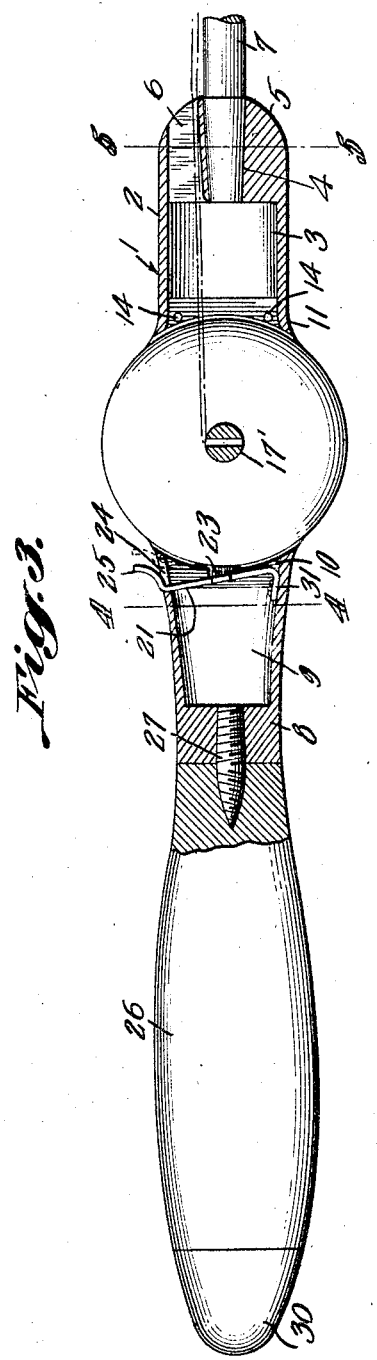
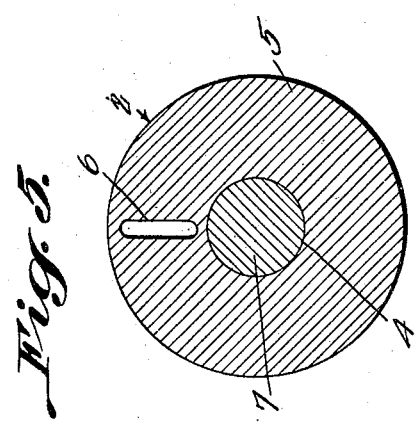
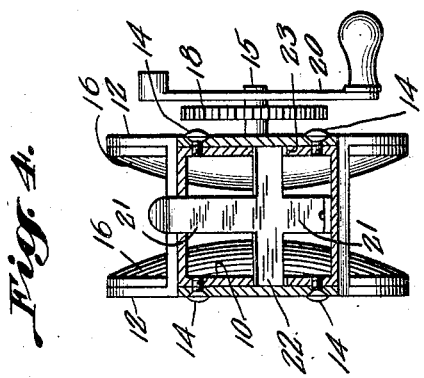
S. J. Budd and J. C. Ford, Inventors
By C. A. Snow & Co.
Attorneys Patented June 30, 1925.

1,544,128

UNITED STATES PATENT OFFICE.

SELDEN J. BUDD, OF MANHASSET, NEW YORK, AND JOHN C. FORD, OF WOODBURY, NEW JERSEY.

FISHING REEL.

Application filed February 1, 1923. Serial No. 616,337.

*To all whom it may concern:*

Be it known that we, SELDEN J. BUDD and JOHN C. FORD, citizens of the United States, residing, respectively, at Manhasset, Long Island, and Woodbury, in the counties of Queens and Gloucester and States of New York and New Jersey, have invented a new and useful Fishing Reel, of which the following is a specification.

One object of this invention is to provide a means whereby a fishing line reel may be disposed symmetrically with respect to the grip of a fishing pole, to the end that the pole may not tend to rotate on its axis, it being a matter of common knowledge that when a reel is disposed eccentrically with respect to the axis of a fish pole, the pole tends to rotate on its axis, the reel sagging downwardly.

Another object of the invention is to provide novel means whereby the fishing line may be carried into the grip portion of the pole in advance of the hand of the fisherman, thus preventing a wetting of the fisherman's hand.

A further object of the invention is so to construct a portion of the grip of the pole that the same may be used to contain hooks, small tools and the like.

A further object of the invention is to provide a novel form of brake for the reel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts appearing in section; Figure 2 is a top plan; Figure 3 is a longitudinal section, parts appearing in elevation; Figure 4 is a cross section on the line 4—4 of Figure 3; Figure 5 is a cross section on the line 5—5 of Figure 3.

The device forming the subject matter of this application includes a grip which is denoted generally by the numeral 1, the grip comprising a forward member 2 having an internal chamber 3, there being a bore 4 in the forward end wall 5 of the member 2, and the end wall 5 being supplied with a passage 6 located parallel to the bore 4. In the bore 4, one end of a pole 7 is adapted to be seated, as shown in Figure 3. The grip portion of the device comprises a rear member 8 having an internal chamber 9, the member 8 being provided at its forward end with a retangular box-like foot 10, the outline of which is best shown in Figure 4. The forward member 2 terminates at its rear end in a foot 11, constructed like the foot 10. Along opposite sides of the feet 10 and 11 extend side plates 12, held to the feet by securing elements 14.

The device includes a reel which may be of any desired construction. By way of illustration, but not of necessity, the reel is shown as comprising a shaft 15 journaled in the side plates 12, the shaft carrying heads 16 disposed closely adjacent to the side plates 12. A pinion 17 is secured to the shaft 15 and meshes with a gear wheel 18 journaled at 19 on one of the side plates 12, rotation being imparted to the gear wheel 18 by means of a counterweighted crank 20, or in any other suitable way.

A resilient brake strip 21 is located in the chamber 9 of the rear member 8 and is provided at its inner end with a flange 31 secured to the member 8 within the chamber 9. Intermediate its ends, the brake strip 21 has lateral arms 22 movable in slots 23 formed in the sides of the foot 10, the slots being closed, outwardly of the foot 10, by the rear ends of the side plates 12. The free end of the brake strip 21 operates in a slot 24 fashioned in the top of the foot 10 as shown in Figures 2 and 3, the free end of the brake strip 21 carrying an exposed thumb piece 25. The arms 22 of the brake strip 21 are movable in the slots 23 to engage the heads 16 of the reel at the periphery of the heads.

The grip comprises an extension 26 detachably held by a screw 27 on the rear member 8, the extension having an internal compartment 28 adapted to receive small tools, fish hooks and the like, the stem 29 of a closure plug 30 being threaded into the outer end of the compartment 28.

It will be obvious that since the longitudinal axis of the grip 1 passes through the axis of rotation of the reel, the reel is disposed symmetrically with respect to the longitudinal axis of the grip, and the pole and the grip, therefore will not tend to rotate in the hand of the fisherman. The fishing line enters the passage 6 and passes rearwardly through the chamber 3 to the shaft 15 of the reel. That portion of the line which is in front of the hand of the fisherman is received within the member 2 and, as will be evident from Figure 3, the hand of the fisherman will not be wet by water carried rearwardly by the line. The arms 22 of the brake strip 21 may be made to engage with the heads 16 of the reel, by exerting thumb or finger pressure against the member 25 of the brake strip.

Any selected materials may be used in the making of the device forming the subject matter of this application. Thus, if desired, the extension 26 may be of wood, the closure plug 30, the members 2 and 8, and the plates 12 being formed of aluminum.

Having thus described the invention, what is claimed is:—

1. A fishing pole comprising a grip including a forward member, a rear member, and plates connecting the forward and rear members, a reel journaled on the plates, and a brake strip secured to the rear member and comprising a lateral arm engaging the reel, the rear member having a slot wherein the arm operates, the slot being bridged by one of the side plates.

2. A fishing pole comprising a grip including a forward member, a rear member, and plates connecting the forward and rear members, a reel journaled on the plates, and a brake strip secured to the rear member and comprising arms engaging the reel, the rear member having slots wherein the arms operate, the slots being bridged by the side plates.

3. A fishing pole comprising a grip, a reel mounted for rotation on the grip, the reel being disposed symmetrically with respect to the axis of the grip, and a brake mounted to swing on the grip, the brake comprising lateral arms engaging the reel, the grip having slots wherein the arms operate, and being provided with an opening through which the brake passes to render the same accessible to an operator.

In testimony that we claim the foregoing as our own, we have hereto affixed our signatures.

SELDEN J. BUDD.
JOHN C. FORD.

Witnesses:
CLARENCE KIRCHER,
FRANK D. PEDRICK.